April 20, 1926.
J. C. FITZGERALD
ANIMAL POKE
Filed April 18, 1925
1,581,727
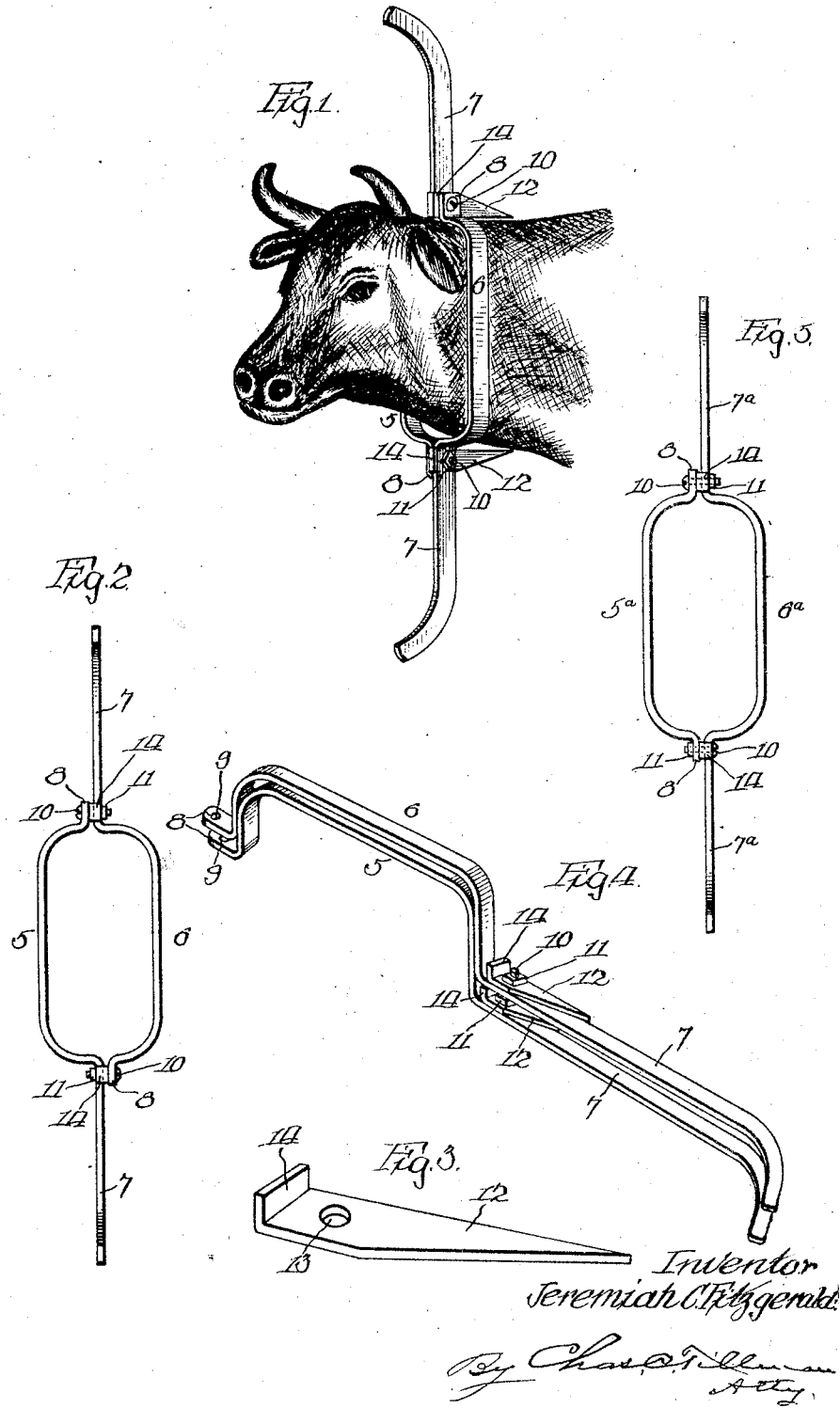
Inventor
Jeremiah C. Fitzgerald
By Chas. O. Tillman
Atty.

Patented Apr. 20, 1926.

1,581,727

UNITED STATES PATENT OFFICE.

JEREMIAH C. FITZGERALD, OF KILBOURN, WISCONSIN.

ANIMAL POKE.

Application filed April 18, 1925. Serial No. 24,061.

*To all whom it may concern:*

Be it known that I, JEREMIAH C. FITZGERALD, a citizen of the United States, and a resident of Kilbourn, in the county of Columbia and State of Wisconsin, have invented certain new and useful Improvements in an Animal Poke, of which the following is a specification.

This invention relates to improvements in means applied to the necks of animals to prevent them breaking through fences, commonly called animal pokes, and it consists in certain peculiarities of the construction, novel arrangement and combination of the various parts thereof as will be hereinafter more fully set forth and specifically claimed.

The invention has for one of its objects the provision of an animal poke of an improved construction, whereby lightness in weight, great strength, durability and high efficiency thereof is attained.

Another object of the invention is, to provide an animal poke of such construction and arrangement of its parts that it can be readily placed in position on the neck of an animal, and there maintained in safety against being removed by the possibility of being rubbed or wrenched off by the animal, yet, in such a way that a comfortable fit will be furnished, and so that there shall be no bolt or rivet heads or other parts exposed to the neck of the animal to cause chafing thereof or injury thereto.

Still another object of the invention is the provision in the device of means to engage the fence, which shall be of such construction as to act as a positive stop to the advancement of the animal through the fence, and to cause prods carried by the poke to sharply prick the animal and also of such form or shape as to prevent injury to the animal or person while handling the former in putting on or taking off the device.

A further and important object contemplated by the invention is, to so form and construct the various parts of the device, that they can be readily detached from one another, for knock-down condition, assembled into a comparatively light and compact package for shipment, and in such a way as to comply with the rules and regulations of the parcel-post division of the United States Post-Office Department, of express companies, and other public carriers, which prohibit transportation of packages having pointed or protruding projections liable to injure other packages or persons handling the same.

Other objects and advantages of the invention will be disclosed in the following description and explanation.

In the accompanying drawing, which serves to illustrate an embodiment of the invention, Fig. 1 is a perspective view showing the device mounted on the neck of an animal and occupying about its normal position thereon.

Fig. 2 is a detached front face view of the poke.

Fig. 3 is a detached perspective view of one of the prods or spurs showing it enlarged.

Fig. 4 is a perspective view illustrating the parts of the poke assembled in knock-down condition for shipment, and Fig. 5 is a detached face view of a modified form of the device.

Like numerals of reference refer to like parts throughout the different views of the drawing.

The device comprises a pair of members each designated as a whole by the reference numerals 5 and 6, and each being by preference an exact duplicate or counter-part of the other. As is clearly shown in Figs. 2 and 4 of the drawings, each of these members 5 and 6 is preferably made of a flat metal strip or bar usually of high carbon steel and each member is curved or bowed outwardly from a point near one of its ends to a point about midway between said ends from which latter point the member is provided with an arm or portion 7 which lies in a plane parallel to a short extension 8 with which each of the bent or bowed portions of said members is provided at its end opposite its arm 7.

Each of the extensions 8 is provided with a transverse opening 9 for the reception of screw bolts 10 which are employed in connection with nuts 11 engaging the same for not only detachably connecting the arms 7 and extensions 8 together, but for securely holding between each pair of said portions a prod which is designated as a whole by the numeral 12 and is made of flat metal of suitable dimensions. Each of the prods 12 is provided with an opening 13 to register with the openings 9 and openings in each of the arms 7 near its juncture with the bent or bowed portion of its member. Each of the prods 12 is provided at its front end with a lip or flange 14 which is extended at about a right angle to the body of the prod and is of about the same width as the thickness of the arm 7 between which and one of the extensions 8 it is mounted. Each of the prods is provided with a rearwardly tapered portion terminating at its free end in a point so as to prick the animal when pressed against its neck or withers.

It will be observed in Figs. 1 and 3 of the drawings that each of the prods 12 has its surface adjacent the neck of the animal straight, while its other surface is beveled or inclined rearwardly, thus providing prods which will not prick the animal while the device occupies its normal position, but which, when the device is forced rearwardly on the neck of the animal, will act positively to prick, or perform the purpose for which they are intended.

In order to place the device in position on an animal's neck, it is only necessary to place one of the members 5 and 6 with its arm 7 extended upwardly and with its bowed portion embracing one side of the neck, and the other of said members with its bowed portion embracing the other side and with its arm extended downwardly. This positioning of the parts will bring the openings 9 in the extensions 8 in register with the openings in the arms 7 near their juncture with their respective bowed portions, when it is manifest the upper prod can be placed horizontally between the upper extension 8 and the upper arm 7 when the flange or lip 14 of said prod will rest against the front surface of the upper arm 7 and the opening 13 in said prod being in register with the said other openings, it is apparent a screw bolt 10 can be inserted through the openings of said member, when by tightening up the nut on said bolt the parts will be securely held together, and in such a way that the prod 12 will be prevented pivotal movement. The same procedure is carried out in mounting the lower prod between the lower extension 8 and the lower arm 7 of the device. By making the members 5 and 6 of high carbon steel bars and by presenting the edges of the parts forwardly, as shown, it is manifest that great strength will be given the fence engaging arms 7 and at the same time the bowed portions of the members of the device will possess sufficient lateral resiliency to permit said parts to be sprung outwardly or so as to fit the necks of animals of different sizes.

By the peculiar construction of the members 5 and 6 and of the prods, it is manifest that by removing the nuts and screw bolts and detaching the parts, one of the prods 12 can be placed on the outer surface of each of the arms 7 so that the opening in the prod will register with the opening in said arm, in which position the flange or lip 14 of each prod will lie against or approximate the adjacent part of the bowed portion of each of the members 5 and 6, when by securing the prods by means of the screws and nuts as shown in Fig. 4 of the drawing, it is manifest that the prods will be held in longitudinal contact with the arms 7 and against pivotal movement thereon, thus preventing their points piercing or protruding from a package in which the parts may be wrapped. After the prods are connected as above explained, one to each of said members, the latter may be nested as shown in Fig. 4 when they are are ready to be prepared into a package for shipment, which will comply with the regulations of public carriers.

By my improvements it will be understood that the parts of the device are or can be made exact duplicates or counter-parts of one another, thus dispensing with the necessity of making right and left members, and thereby simplifying and economizing in the manufacture of the article, besides rendering its assemblage a very easy matter.

It is obvious that instead of fastening the prods 12 to the members 5 and 6 as shown in Fig. 4 and above described, the said prods, screws, and nuts ran be placed in a small bag and safely confined therein and that said bag may be attached to the members 5 and 6 in any suitable way which protection by means of the bag, will also comply with the requirements of shipment.

By providing the arms 7 of the side members of the poke with the forwardly bent portions and slightly rounding the ends thereof, it is apparent that said arms will more securely engage the wire strands of the fence and that sharp edges or corners of the end portions of said arms which might injure the animal or the person handling the same, will be eliminated.

In Fig. 5 of the drawing, is shown a modification in the construction of the bars forming the neck band or collar for the animal and the fence engaging arrows, which consists in providing two members 5ª and 6ª, only one of which for example, the member 6ª, is provided with a fence engaging arm 7ª at each end of its outwardly bent or bowed portion, instead of at opposite ends of each bowed part of the above described construction, and in positioning the middle of the bent or bowed portion of the member 6ª, about midway between the ends of the arms 7ª, instead of in the position shown in the other construction. The shorter member, for example 5ª, of this modified form, has an outwardly bent portion with its middle midway betwen its ends of a size and shape to coincide with the other outwardly bowed part, so that when the said members are detachably secured together at the junctures of the respective ends of their bent portions, they will form a complete collar or band encircling the neck of the animal. Prods 12, securing bolts 10, and nuts 11 of the same construction as in the other form of the device are employed in the modified form and in similar arrangement.

Having thus fully described my invention, what I claim as new and desire to secure by Letters Patent is:

An animal poke comprising two pieces of flat metal overlapping each other longitudinally part way of their lengths and each provided in its overlapping portion with an outward bend to receive the neck of an animal, and also to permit of said bars being nested when in knock-down condition, each end of each of said bends being at substantially a right angle to the adjacent portions of said pieces, a bolt detachably and transversely securing said pieces together at the juncture of the ends of said bent portions, said pieces each having an opposed fence engaging arm extended from one end of its bent portion, and a rearwardly extended prod mounted on each of said bolts between said pieces, each prod having on its front end a transverse flat faced flange to engage the edge of one of said pieces for preventing the pivotal movement of said prod, when in its operative position, and also for co-action with a part of the bent portion of one of said pieces to prevent lateral pivotal movement of the prod when the same is located longitudinally on one of the fence engaging arms for the purpose of shipment.

JEREMIAH C. FITZGERALD,